(12) United States Patent
Wang et al.

(10) Patent No.: US 10,408,511 B2
(45) Date of Patent: Sep. 10, 2019

(54) HEAT EXCHANGE DEVICE

(71) Applicant: Zhejiang Sanhua Automotive Components Co., Ltd., Hangzhou, Zhejiang (CN)

(72) Inventors: Jingpeng Wang, Zhejiang (CN); Yuting Yin, Zhejiang (CN); Weixin Jiang, Zhejiang (CN); Meng Chen, Zheijiang (CN); Zhou Lv, Hangzhou (CN); Fangfang Yi, Zhejiang (CN); Jiang Zou, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 182 days.

(21) Appl. No.: 15/554,734

(22) PCT Filed: Jul. 13, 2016

(86) PCT No.: PCT/CN2016/089923
§ 371 (c)(1),
(2) Date: Aug. 31, 2017

(87) PCT Pub. No.: WO2017/012495
PCT Pub. Date: Jan. 26, 2017

(65) Prior Publication Data
US 2018/0080693 A1 Mar. 22, 2018

(30) Foreign Application Priority Data

Feb. 25, 2015 (CN) .......................... 2015 1 0997992
Jul. 17, 2015 (CN) .......................... 2015 1 0423629

(51) Int. Cl.
*F25B 41/06* (2006.01)
*H01M 10/613* (2014.01)
(Continued)

(52) U.S. Cl.
CPC ............ *F25B 41/062* (2013.01); *F25B 39/00* (2013.01); *F28D 9/005* (2013.01); *F28F 27/02* (2013.01);
(Continued)

(58) Field of Classification Search
CPC ...... F25B 41/062; F25B 39/00; F25B 39/022; F25B 2500/13; F25B 2500/18;
(Continued)

(56) References Cited

U.S. PATENT DOCUMENTS 7,490,662 B2 * 2/2009 Eliades ................... F28F 27/02
123/41.1
7,735,520 B2 * 6/2010 Peric ...................... F16K 15/144
137/855
(Continued)

FOREIGN PATENT DOCUMENTS

CN          2320977 Y      5/1999
CN        101677157 A      3/2010
(Continued)

OTHER PUBLICATIONS

Partial European Search Report for European Application No. 16827186.4, dated Jan. 25, 2019.
(Continued)

*Primary Examiner* — Justin M Jonaitis
(74) *Attorney, Agent, or Firm* — Wolf, Greenfield & Sacks, P.C.

(57) ABSTRACT

A heat exchange device includes a heat exchanger and a mounting plate for fixing the heat exchange device, and includes first and second flow passages which are not in communication with each other. The mounting plate includes a communication hole, a protruding portion and a mounting hole. The protruding portion protrudes outwards from the front side of the mounting plate. The mounting hole
(Continued)

extends through the protruding portion and the mounting plate and includes a valve core receiving cavity. The valve core receiving cavity is in communication with the communication hole via a connection groove at a back side of the mounting plate; the mounting plate is fixed to the heat exchanger in a sealed manner, the mounting hole is in communication with the first flow passage, and the communication hole is in communication with the first flow passage via the connection groove and the mounting hole.

20 Claims, 7 Drawing Sheets

(51) Int. Cl.
| | | |
|---|---|---|
| H01M 10/625 | (2014.01) | |
| H01M 10/6567 | (2014.01) | |
| F25B 39/00 | (2006.01) | |
| F28F 27/02 | (2006.01) | |
| F28D 9/00 | (2006.01) | |
| H01M 10/615 | (2014.01) | |
| F25B 39/02 | (2006.01) | |
| F28D 21/00 | (2006.01) | |

(52) U.S. Cl.
CPC ....... *H01M 10/613* (2015.04); *H01M 10/615* (2015.04); *H01M 10/625* (2015.04); *H01M 10/6567* (2015.04); *F25B 39/022* (2013.01); *F25B 2500/13* (2013.01); *F25B 2500/18* (2013.01); *F28D 2021/0031* (2013.01); *F28D 2021/0043* (2013.01); *F28F 2280/06* (2013.01); *H01M 2220/20* (2013.01)

(58) Field of Classification Search
CPC ............ H01M 10/613; H01M 10/615; H01M 10/625; H01M 10/6567; H01M 2220/20; F28D 9/005; F28D 2021/0031; F28D 2021/0043; F28D 7/00; F28D 9/00; F28D 1/0308; F28D 9/0006; F28D 9/0031; F28D 9/0037; F28D 9/0062; F28D 9/0081; F28D 9/0043; F28D 9/0056; F28D 9/0075; F28F 27/02; F28F 2280/06; F28F 3/005; F28F 3/08; F28F 3/02; F28F 3/083; F28F 3/086
USPC .......... 165/96, 101, 100, 164, 165, 166, 167
See application file for complete search history.

(56) References Cited

U.S. PATENT DOCUMENTS

| | | | |
|---|---|---|---|
| 9,464,853 B2* | 10/2016 | Sheppard | F28F 27/00 |
| 10,066,878 B2 | 9/2018 | Huang et al. | |
| 2003/0019620 A1* | 1/2003 | Pineo | F01M 5/00 165/297 |
| 2008/0023190 A1 | 1/2008 | Peric | |
| 2010/0243200 A1* | 9/2010 | Baker, Jr. | B60H 1/00342 165/41 |
| 2013/0061630 A1 | 3/2013 | Schaefer et al. | |
| 2013/0126149 A1* | 5/2013 | Kim | F01P 3/18 165/297 |
| 2013/0133874 A1* | 5/2013 | Kim | F01P 3/18 165/296 |
| 2013/0133875 A1* | 5/2013 | Kim | F28F 27/02 165/296 |
| 2013/0160972 A1 | 6/2013 | Sheppard et al. | |
| 2013/0319634 A1* | 12/2013 | Sheppard | F28F 27/00 165/96 |
| 2013/0327287 A1 | 12/2013 | Kim et al. | |
| 2014/0013787 A1 | 1/2014 | Wesner et al. | |
| 2014/0116648 A1 | 5/2014 | Cho et al. | |
| 2014/0150739 A1 | 6/2014 | Kim et al. | |
| 2015/0369115 A1 | 12/2015 | Kim et al. | |
| 2016/0363399 A1* | 12/2016 | Kim | F16K 31/002 |
| 2017/0030456 A1* | 2/2017 | Zou | F01M 5/007 |
| 2017/0175599 A1* | 6/2017 | Ariyama | F01M 5/002 |

FOREIGN PATENT DOCUMENTS

| | | |
|---|---|---|
| CN | 103328914 A | 9/2013 |
| CN | 203231672 U | 10/2013 |
| CN | 103712383 A | 4/2014 |
| CN | 103790689 A | 5/2014 |
| CN | 103851938 A | 6/2014 |
| CN | 203771825 U | 8/2014 |
| CN | 104101237 A | 10/2014 |
| CN | 104105913 A | 10/2014 |
| CN | 204007245 U | 12/2014 |
| CN | 104296422 A | 1/2015 |
| JP | H08-094209 A | 4/1996 |
| KR | 10-1526427 B1 | 6/2015 |
| WO | WO 00/50832 A1 | 8/2000 |
| WO | WO 2014/048219 A1 | 4/2014 |

OTHER PUBLICATIONS

Chinese 1st Office Action dated Jan. 3, 2019 in connection with Chinese Application No. 201510997992.4.
International Search Report for Application No. PCT/CN2016/089923 dated Oct. 14, 2016.
First Office Action for Chinese Application No. 201510423629.1, dated Apr. 11, 2019.

* cited by examiner

HEAT EXCHANGE DEVICE

The present application is the national phase of International Application No. PCT/CN2016/089923, titled "HEAT EXCHANGE DEVICE", filed on Jul. 13, 2016, which claims priority to Chinese patent application No. 201510423629.1 titled "HEAT EXCHANGE DEVICE", filed with the Chinese State Intellectual Property Office on Jul. 17, 2015, and Chinese patent application No. 201510997992.4 titled "HEAT EXCHANGE DEVICE AND HEAT EXCHANGER", filed with the Chinese State Intellectual Property Office on Dec. 25, 2015, the entire disclosures of all applications are incorporated herein by reference.

FIELD

The present application relates to a heat exchange device which is applicable for a thermal management system of batteries of an electric vehicle and the like.

BACKGROUND

In general, in a thermal management system of a battery of an electric vehicle, the battery of the electric vehicle will produce heat while working. In order to ensure the normal work of the battery, it needs to cool the battery, and it is common to use the coolant for cooling. A conventional battery cooling device includes a heat exchanger and an expansion valve, a liquid refrigerant enters the heat exchanger after being throttled by the expansion valve, and the refrigerant and the coolant exchange heat in the heat exchanger, thus, the coolant is cooled, and the cooled coolant can be directly or indirectly used for cooling the batteries in the battery pack. After absorbing heat of the battery pack, the coolant has a raised temperature, and then returns to the heat exchanger to be cooled, and the above process is repeated.

In the conventional thermal management system, the heat exchanger and the expansion valve are independent components, and are connected by a pipeline and other means. The heat exchanger and the expansion valve are spaced at a great distance, and the vapor-liquid two-phase refrigerant, after passing through the expansion valve, will change the flow state over this distance, such as vapor-liquid stratification, which will affect the cooling effect. In addition, the pipeline and other connecting components may cause a great weight of the entire assembly, a complicated installation environment, and a poor anti-vibration performance of the whole assembly, is apt to cause breakage of connecting pipes and other phenomena, and causes a high cost.

Therefore, a technical issue to be addressed urgently by the person skilled in the art is to provide an integrated device including a heat exchanger and an expansion valve, and this integrated device has a compact structure, is easy to install, and has a good anti-vibration performance and a low cost.

SUMMARY

An object of the present application is to provide a heat exchange device which has a simple structure and a reliable performance.

To achieve the above object, a heat exchange device is provided according to the present application, which includes a heat exchanger; and a mounting plate configured to fix the heat exchange device, wherein, the heat exchanger includes a first flow passage and a second flow passage which are not in communication with each other, a front side of the mounting plate includes a fitting portion, and the mounting plate includes a communication hole, a protruding portion and a mounting hole which are all located at a position where the fitting portion is located, the protruding portion protrudes outwards from the front side of the mounting plate, and the mounting hole extends through the protruding portion and the mounting plate, the mounting plate defines a valve core receiving cavity at the protruding portion, and the valve core receiving cavity is a part of the mounting hole; a back side of the mounting plate is further provided with a groove, and the valve core receiving cavity is in communication with the communication hole via the groove; the heat exchange device is further provided with a positioning portion, and the positioning portion extends into the first flow passage, and the mounting plate is fixed to the heat exchanger in a sealed manner, the mounting hole is in communication with the first flow passage, and the communication hole is in communication with the first flow passage via the groove and the mounting hole.

In the heat exchange device, the heat exchanger includes a heat exchanger core, and an end plate and a bottom plate respectively located at two ends of the heat exchanger core, the end plate is provided with a port, and the positioning portion is provided at an outer peripheral side of the port and protrudes from a plate plane of the end plate by a certain height, the positioning portion is a hollow structure, and the hollow structure of the positioning portion has an inner diameter smaller than or equal to an inner diameter of the port, and the port is toward the mounting hole and is in communication with the mounting hole.

In the heat exchange device, a direction in which the positioning portion protrudes from the plate plane of the end plate is opposite to a direction in which the protruding portion protrudes from the front side of the mounting plate, the valve core receiving cavity includes a first cavity, a second cavity and a third cavity sequentially from bottom to top, and inner diameters of the first cavity, the second cavity and the third cavity are sequentially increased; an inner wall of the first cavity is provided with a threaded connecting portion, and the first cavity has an inner diameter greater than or equal to the inner diameter of the port, and a projection of the port on the mounting plate partially coincides with or completely coincides with a projection of the valve core receiving cavity on the mounting plate.

In the heat exchange device, the heat exchanger includes a heat exchanger core, and an end plate and a bottom plate respectively located at two ends of the heat exchanger core, the end plate is provided with a port, and the mounting plate includes a first mounting plate and a second mounting plate, the second mounting plate is closer to the heat exchanger than the first mounting plate, the protruding portion is formed on a front side of the first mounting plate, the groove is formed in a back side of the first mounting plate, and the communication hole extends through the first mounting plate, the positioning portion is arranged on the second mounting plate and is configured to cooperate with the valve core receiving cavity; a direction in which the positioning portion protrudes from the second mounting plate is opposite to a direction in which the protruding portion protrudes from the first mounting plate, the mounting hole extends though the protruding portion, the first mounting plate, the second mounting plate and the positioning portion, and the first mounting plate cooperates with the second mounting plate and is mounted to the second mounting plate in a sealed manner.

In the heat exchange device, the heat exchanger includes a heat exchanger core, and an end plate and a bottom plate respectively located at two ends of the heat exchanger core, the end plate is provided with a port, the positioning portion is arranged on a back side of the mounting plate, the positioning portion is opposite to the protruding portion, and the mounting hole extends through the protruding portion and the positioning portion, the positioning portion includes a protruding segment and an isolation segment, the protruding segment of the positioning portion is located between the end plate and the bottom plate, the protruding segment has an outer diameter smaller than an inner diameter of the port, and an end of the protruding segment passes through the port; the isolation segment of the positioning portion is located outside the heat exchanger core, the isolation segment is located between the end plate and the mounting plate, and the isolation segment is close to the groove, and a first opening is formed between the isolation segment and the protruding portion, and the groove is in communication with the mounting hole through the first opening.

In the heat exchange device, the heat exchange device further includes a valve assembly, the valve assembly includes a valve seat, and the valve seat includes a first part and a second part which are respectively upper and lower portions, and a portion of the first part is fixed to the valve core receiving cavity in a sealed manner, and the second part is fixed to the positioning portion in a sealed manner, the second part includes a valve core inlet passage, a valve core outlet passage, and a throttling orifice, and the throttling orifice is provided between the valve core inlet passage and the valve core outlet passage, a dimension of a flow passage of the throttling orifice is adjustable, and the valve core inlet passage is in communication with the valve core outlet passage through the throttling orifice; and the valve core inlet passage is in communication with the groove, and the valve core outlet passage is in communication with the first flow passage.

In the heat exchange device, an outer diameter of the second part is smaller than an outer diameter of the first part and smaller than an inner diameter of the valve core receiving cavity, the second part is not in contact with an inner wall of the valve core receiving cavity, and the communication hole is in communication with the valve core inlet passage through the groove and a space between the second part and a portion of an inner wall, at a position where the valve core receiving cavity is located, of the mounting plate.

In the heat exchange device, a lower end of the second part extends into the positioning portion, and the lower end of the second part and a portion, corresponding to the positioning portion, of an inner wall of the mounting hole are mounted in a sealed manner by a sealing ring, and the valve core outlet passage is in direct communication with the first flow passage of the heat exchanger, and at least a part of the valve core inlet passage is located in the valve core receiving cavity above the positioning portion.

In the heat exchange device, the heat exchanger includes a plurality of plates which are stacked, the plates includes a plurality of first plates, a plurality of second plates, and a third plate, the plates are stacked to form the first flow passage and the second flow passage, each of the first plates includes a first port and a second port, each of the second plates also includes a first port and a second port, the third plate includes a first partition part and a second port, the first partition part is located on the third plate at a position corresponding to the first ports of the first plates and the second plates, the first plates and the second plates are stacked to allow the first ports of the first plates and the first ports of the second plates to be aligned to form a first channel; and the first plates, the second plates and the third plate are stacked to allow the second ports of the first plates, the second ports of the second plates and the second port of the third plate to be aligned to form a second channel; the first channel and the second channel are a part of the first flow passage, the first channel is partitioned into at least two sub-channels by the first partition part, and each of the sub-channels of the first channel is in communication with an adjacent sub-channel of the first channel via the second channel; the first flow passage is divided into at least two heat exchange sections by the third plate, and flow directions of fluid in adjacent heat exchange sections are opposite to each other.

In the heat exchange device, the plates further include at least one fourth plate, the fourth plate is further away from the mounting plate than the third plate, the fourth plate includes a first port and a second partition part, the second partition part is located on the fourth plate at a position corresponding to the second ports of the first plates, the second ports of the second plates and the second port of the third plate; the first plates, the second plates and the fourth plate are stacked to allow the first ports of the first plates, the first ports of the second plates, and the first port of the fourth plate to be aligned to form a first channel; the first plates, the second plates and the third plate are stacked to allow the second ports of the first plates, the second ports of the second plates, and the second port of the third plate to be aligned to form a second channel; the first channel is partitioned into at least two sub-channels by the first partition part, and the second channel is divided into at least two sub-channels by the second partition part, and each of the sub-channels of the first channel is in communication with an adjacent sub-channel of the first channel through the second channel, and each of the sub-channels of the second channel is in communication with an adjacent sub-channel of the second channel through the first channel, the first flow passage is divided into a plurality of heat exchange sections by the third plate and the fourth plate, and flow directions of fluid in adjacent heat exchange sections are opposite to each other.

In the heat exchange device, the heat exchange device is provided with a first through hole, a second through hole, a third through hole and a fourth through hole, the first through hole and the second through hole are in communication with the second flow passage, and the third through hole and the fourth through hole are in communication with the first flow passage, and the fourth through hole is located in the mounting plate, the fourth through hole is the communication hole in communication with the groove, and the third through hole is located in the bottom plate, and the at least two heat exchange sections include a first heat exchange section and a second heat exchange section divided by the third plate, the third through hole is in communication with the sub-channel, away from the mounting plate, of the first channel, and the fourth through hole is in communication with the third through hole via the groove, the sub-channel of the first channel which is close to the mounting plate, the second channel, and the sub-channel of the first channel which is away from the mounting plate.

In the heat exchange device, the heat exchange device is provided with a first through hole, a second through hole, a third through hole and a fourth through hole; the first through hole and the second through hole are in communication with the second flow passage, and the third through hole and the fourth through hole are in communication with the first flow passage, the fourth through hole is located in the mounting plate, and the communication hole in communication with the groove is the fourth through hole, and the third through hole is located in the bottom plate, and the plurality of heat exchange sections includes a first heat exchange section, a second heat exchange section and a third heat exchange section which are divided by the third plate and the fourth plate, and the third through hole is in communication with the sub-channel, away from the mounting plate, of the second channel; and the fourth through hole is in communication with the third through hole via the groove, the sub-channel of the first channel which is close to the mounting plate, the sub-channel of the second channel which is close to the mounting plate, the sub-channel of the first channel which is away from the mounting plate, and the sub-channel of the second channel which is away from the mounting plate.

In the heat exchange device, the heat exchange device is provided with a first through hole, a second through hole, a third through hole and a fourth through hole; the first through hole and the second through hole are in communication with the second flow passage, and the third through hole and the fourth through hole are in communication with the first flow passage, the third through hole and the fourth through hole are located in the mounting plate, and the fourth through hole is the communication hole in communication with the groove, and the heat exchanger further includes a first connection pipe in communication with the first through hole, a second connection pipe in communication with the second through hole, a third connection pipe in communication with the third through hole, and a fourth connection pipe in communication with the fourth through hole; the third connection pipe has an outer diameter smaller than an inner diameter of the second channel, and one end of the third connection pipe extends into the sub-channel, away from the mounting plate, of the second channel; the second partition part of the fourth plate has an opening, the third connection pipe passes through the opening of the second partition part, and a pipe wall of the third connection pipe is fixed to the opening of the second partition part in a sealed manner.

In the heat exchange device, the back side of the mounting plate is further provided with at least two positioning protrusions which protrude from the back side of the mounting plate by a certain height, the end plate is provided with positioning holes corresponding to the positioning protrusions respectively, and the positioning protrusions are fitted with the positioning holes respectively; the valve assembly further includes a coil assembly, and an outer side wall of the protruding portion is provided with a threaded fixing portion configured to fix the coil assembly.

In the heat exchange device, the heat exchanger is an evaporator, the first flow passage is configured to allow circulation of a refrigerant, and the second flow passage is configured to allow circulation of a coolant. The heat exchange device is provided with a first through hole, a second through hole, a third through hole and a fourth through hole; the first through hole and the second through hole are in communication with the second flow passage, and the third through hole and the fourth through hole are in communication with the first flow passage, and the fourth through hole is the communication hole in communication with the groove; the heat exchanger further includes a first connection pipe in communication with the first through hole, a second connection pipe in communication with the second through hole, a third connection pipe in communication with the third through hole, and a fourth connection pipe in communication with the fourth through hole; the first connection pipe is a coolant outlet pipe, and the second connection pipe is a coolant inlet pipe; the fourth connection pipe is a refrigerant inlet pipe and the third connection pipe is a refrigerant outlet pipe, and the fourth through hole has an inner diameter smaller than an inner diameter of the third through hole.

In the present application, the heat exchanger is integrated with the function of a control valve, a part of the mounting plate has the function of a valve body, thus, no connection components are required, the structure is simple and compact, has a reliable performance, a high anti-vibration performance and a low using cost, and is easy to install, and further, the vapor-liquid stratification phenomenon can be effectively inhibited, which facilitates superheat control of the system and can improve the overall performance of the system.

DETAILED DESCRIPTION

Figure 1:
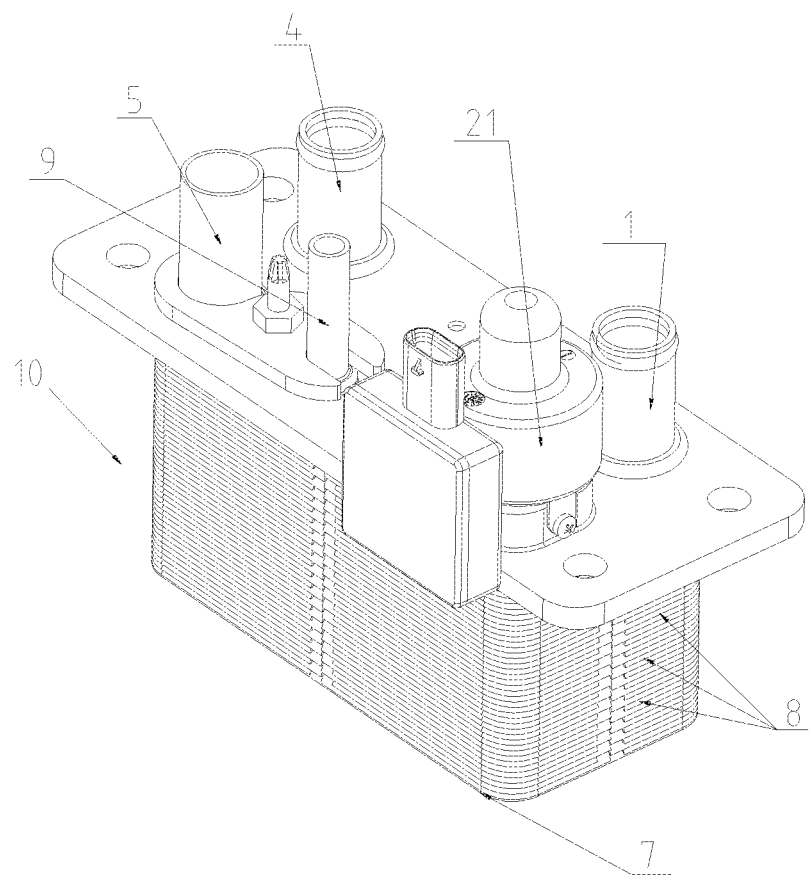
FIG. 1 is a schematic perspective view of an embodiment of a heat exchange device according to the present application.

Embodiments of the present application are described hereinafter with reference to the drawings.

FIGS. 1 to 7 show a heat exchange device according to an embodiment of the present application. As shown, the heat exchange device includes a heat exchanger 10, a valve assembly, and a mounting plate 3 configured to fix the heat exchange device. The valve assembly includes a valve core assembly 22 and a coil assembly 21. Further, the mounting plate 3 is also fixedly mounted to the heat exchanger 10, the coil assembly 21 and the valve core assembly 22.

The heat exchanger 10 may be used as an evaporator. The heat exchanger 10 includes a second flow passage configured to allow flow of a coolant, and a first flow passage configured to allow flow of a refrigerant. The first flow passage includes a refrigerant inlet and a refrigerant outlet, and the second flow passage includes a coolant inlet and a coolant outlet. The coolant inlet may be connected to a second connection pipe 4, the coolant outlet may be connected to a first connection pipe 1, the refrigerant outlet may be connected to a third connection pipe 5, and the refrigerant inlet may be directly connected to an outlet of the valve core assembly 22.

The heat exchanger 10 further includes a heat exchanger core, and an end plate 6 and a bottom plate 7 respectively located at two ends of the heat exchanger core. The heat exchanger core includes multiple first plates and multiple second plates which are stacked alternately, and each of the first plates and its adjacent second plates at two sides of this first plate form a first passage and a second passage respectively. The first plate and the adjacent second plate at one side of the first plate form the first passage, and the first plate and the adjacent second plate at the other side of the first plate form the second passage. The first passage is a part of the first flow passage and the second passage is a part of the second flow passage. In this embodiment, the first plates and the second plates are all embodied as the plates 8 having the same shapes and structures. When stacking the plates, the first plate is rotated by 180 degrees with respect to the second plate and then be stacked. By using the plates 8 having the same shapes and structures, only one pair of moulds are needed for manufacturing the plates, thus, the manufacturing process is simple, has less processing steps, and may have a reduced cost.

The refrigerant inlet and the refrigerant outlet may be arranged on the same side or different sides of the heat exchanger 10, and the coolant inlet and the coolant outlet may be provided on the same side or different sides of the heat exchanger 10. The first connection pipe 1, the second connection pipe 4, and the third connection pipe 5 may each be an aluminum alloy tube and may be connected to the heat exchanger 10 by brazing. Alternatively, the three connection pipes may also be partially or all fixedly connected to the mounting plate 3 by brazing and then connected to the heat exchanger 10 through the mounting plate 3.

Figure 2:
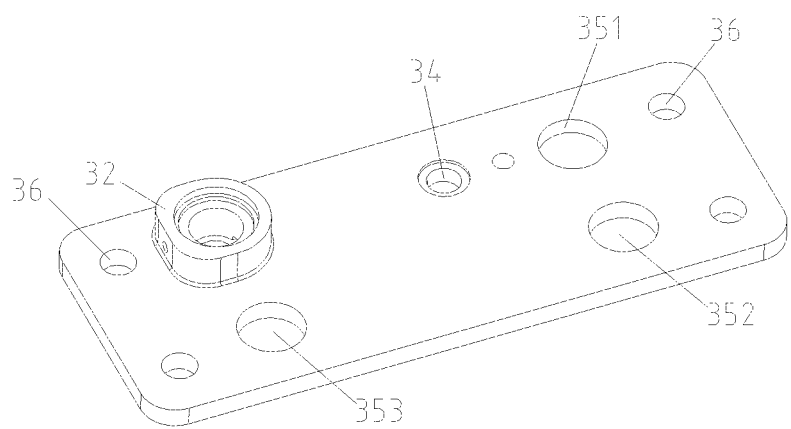
FIG. 2 is a schematic perspective view of a mounting plate of the heat exchange device shown in FIG. 1.
Figure 3:
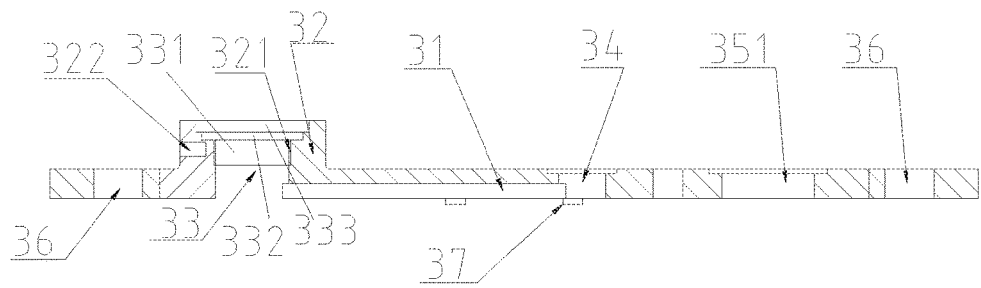
FIG. 3 is a schematic sectional view of the mounting plate shown in FIG. 2.

In an embodiment, the heat exchanger 10 is a plate-type heat exchanger, and may also be a plate-fin type heat exchanger, and other types of heat exchangers are applicable as well. As shown in FIGS. 2 and 3, the mounting plate 3 may be formed of a metal sheet through processes including stamping and machining, or may also be formed of a metal sheet by die casting. The metal sheet may embody an aluminum alloy material. The mounting plate 3 includes a fitting portion and multiple mounting structures 36 located outside the fitting portion. In mounting directions extending through the mounting structures 36, the mounting structures 36 are completely exposed outside the heat exchanger 10, and the mounting structures 36 does not interfere with the heat exchanger core. With this arrangement, when screws (not shown) are fitted into the mounting structures 36 to install and fix the heat exchange device, the heat exchanger 10 will not be touched. This design, in one aspect, reduces the cost and installation difficulty of the heat exchange device, and, in another aspect, reduces the probability of damage to the heat exchanger 10 in installation.

It should be noted here that the shape and structure of the mounting plate 3 and the specific position and the number of mounting structures 36 may be provided in accordance with the specific mounting position of the heat exchange device.

The fitting portion includes a first through hole 353 configured to fixedly install the first connection pipe 1, a second through hole 352 configured to fixedly install the second connection pipe 4, a third through hole 351 configured to fixedly install the third connection pipe 5, a fourth through hole 34 configured to fixedly install the fourth connection pipe 9, and a protruding portion 32 configured to fixedly install the coil assembly 21 and the valve core assembly 22. The first through hole 353 and the second through hole 352 are in communication with the second flow passage of the heat exchanger 10, and the third through hole 351 is in communication with the first flow passage of the heat exchanger 10. In this embodiment, the first through hole 353 and the second through hole 352 are in communication with the coolant outlet and the coolant inlet of the heat exchanger 10 respectively, and the third through hole 351 is in communication with the refrigerant outlet of the heat exchanger 10.

The first through hole 353 and the coolant outlet are both rounded and are arranged non-coaxially. The first through hole 353 has an inner diameter greater than an inner diameter of the coolant outlet to form a step, to facilitate butting the first through hole 353 with one end of the first connection pipe 1 and positioning the first connection pipe 1, to facilitate the installation of the first connection pipe 1. The second through hole 352 and the coolant outlet are both rounded and are arranged non-coaxially. The second through hole 352 has an inner diameter greater than an inner diameter of the coolant outlet to form a step, to facilitate butting the second through hole 352 with one end of the second connection pipe 4 and positioning the second connection pipe 4, to facilitate the installation of the second connection pipe 4. Similarly, the third through hole 351 and the refrigerant outlet are both rounded and are arranged non-coaxially. The third through hole 351 has an inner diameter greater than an inner diameter of the refrigerant outlet to form a step, to facilitate butting the third through hole 351 with one end of the third connection pipe 5 and positioning the third connection pipe 5, to facilitate the installation of the third connection pipe 5.

The protruding portion 32 protrudes from a plate plane of the mounting plate 3 by a certain height. The mounting plate 3 is provided with a mounting hole at the position where the protruding portion 32 is located, and the mounting hole extends through the protruding portion 32 and the mounting plate 3. The mounting hole includes a valve core receiving cavity 33, and a major part of the valve core receiving cavity 33 is located in the protruding portion 32. The valve core receiving cavity 33 includes, sequentially from bottom to top, a first cavity 331, a second cavity 332 and a third cavity 333, and inner diameters of the first cavity 331, the second cavity 332 and the third cavity 333 are sequentially increased. An inner wall of the first cavity 331 of the protruding portion 32 is provided with a threaded connecting portion 321 for fixing the valve core assembly 22, and a stepped portion is formed between the second cavity 332 and the first cavity 331 and is configured to receive a sealing ring, and by arranging the sealing ring, the sealing performance of the valve core assembly 22 fixed in the valve core receiving cavity 33 is increased.

An outer side wall of the protruding portion 32 is further provided with a threaded fixing portion 322 for fixing the coil assembly 21, and the coil assembly 21 is fixedly mounted to the mounting plate 3 by the threaded fixing portion 322. Of course, the threaded fixing portion 322 may be provided directly in the plate plane of the mounting plate 3, and may also be provided in the valve core assembly. In this embodiment, by providing the threaded fixing portion 322 in the protruding portion 32, the mounting stability of the coil assembly can be improved.

Here, a side, having the protruding portion 32, of the mounting plate 3 is defined as a front side of the mounting plate 3, and a side, in contact with the heat exchanger, of the mounting plate 3 is defined as a reverse side of the mounting plate 3. A groove 31 is further provided in the reverse side of the mounting plate 3, and the groove 31 communicates the fourth through hole 34 with the valve core receiving cavity 33, and the fourth through hole 34 may be in communication with the valve core receiving cavity through the groove 31.

Multiple positioning protrusions 37 may be provided on the reverse side of the mounting plate 3, and the multiple positioning protrusions 37 protrude from the reverse side of the mounting plate 3 by a certain height. The positioning and mounting of the mounting plate 3 to the heat exchanger 10 can be facilitated by the positioning protrusions 37.

Figure 4:
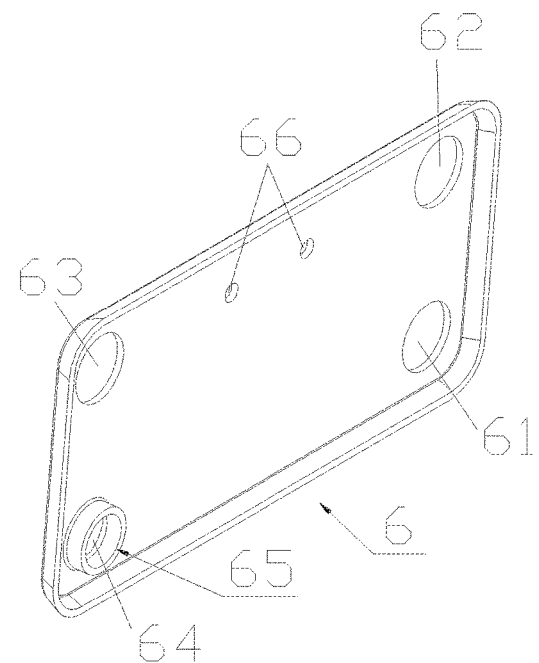
FIG. 4 is a schematic perspective view of an end plate of the heat exchange device shown in FIG. 1.
Figure 5:
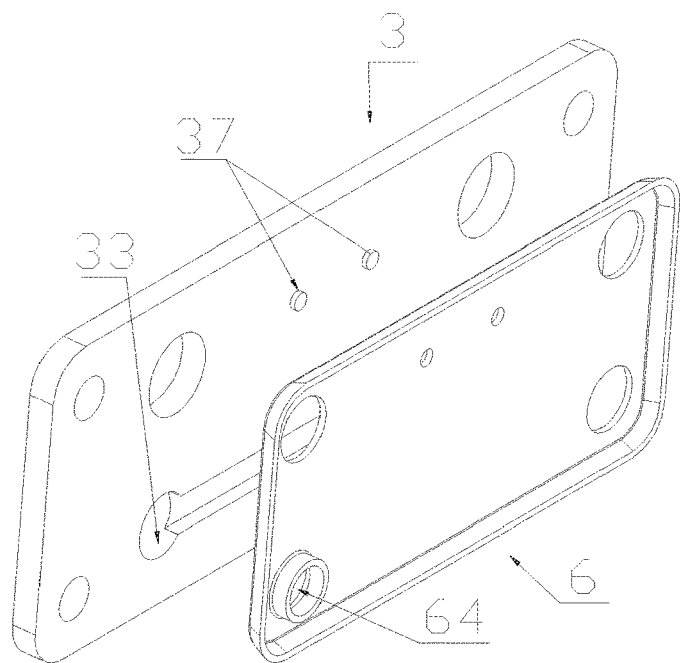
FIG. 5 is a schematic perspective view of the correspondence relationship between the end plate and the mounting plate of the heat exchange device shown in FIG. 1 in installation.

As shown in FIG. 4, the end plate 6 includes a third port 63, a fourth port 62, a first port 61 and a second port 64 located at four corners of the end plate 6, respectively. A hollow positioning portion 65 is formed at an outer peripheral side of the second port 64 and protrudes from a plate plane of the end plate 6 by a certain height. The positioning portion 65 has an inner diameter smaller than or equal to the inner diameter of the second port 64, and the positioning portion 65 may be a punched hole structure formed by punching.

The end plate 6 may further be provided with positioning holes 66 corresponding to the positioning protrusions 37 respectively. The heat exchanger and the mounting plate can be quickly positioned during installation by the fitting of the positioning protrusions 37 and the positioning holes 66 respectively, thus facilitating the installation, and also improving the installation accuracy and the yield of the heat exchange device.

The third port 63 corresponds to the first through hole 353, the fourth port 62 corresponds to the second through hole 352, the first port 61 corresponds to the third through hole 351, and the second port 64 corresponds to the valve core receiving cavity 33. The projection of the second port 64 on the mounting plate 3 partially coincides with or completely coincides with the projection of the valve core receiving cavity 33 on the mounting plate 3. In addition, the valve core receiving cavity 33 has an inner diameter greater than or equal to the inner diameter of the second port 64, and a part of the valve core assembly 22 can extend into the positioning portion 65 by passing through the valve core receiving cavity 33. In addition, the direction in which the positioning portion 65 protrudes from the plate plane of the end plate 6 is opposite to the direction in which the protruding portion 32 protrudes from the front side of the mounting plate 3.

Of course, the direction in which the positioning portion 65 protrudes from the plate plane of the end plate 6 may also be the same as the direction in which the protruding portion 32 protrudes from the front side of the mounting plate 3. In this case, the height of the positioning portion 65 should be less than the depth of the groove 31. The arrangement of the positioning portion 65 according to this embodiment can reduce the thickness of the mounting plate 3 in one aspect, and can further reduce the distance between the outlet of the valve core assembly 22 and the heat exchanger 10 in another aspect, thereby improving the heat transfer performance of the heat exchanger.

Figure 6:
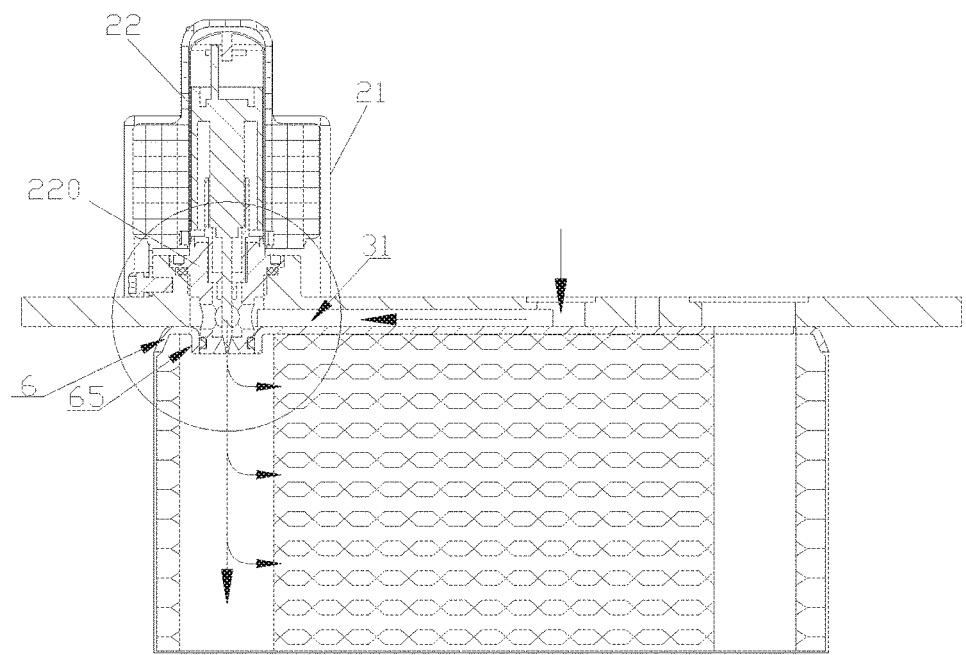
FIG. 6 is a schematic sectional view of the heat exchange device shown in FIG. 1.
Figure 7:
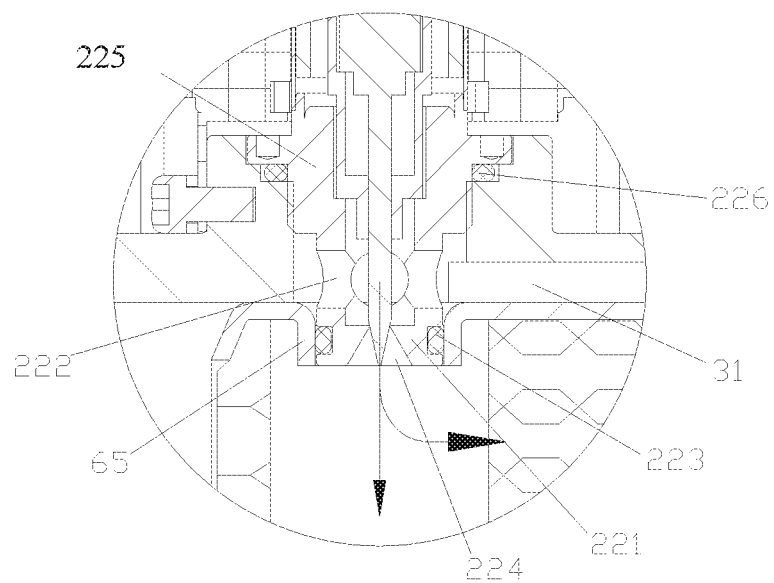
FIG. 7 is a partially enlarged schematic view of FIG. 6.

As shown in FIGS. 6 and 7, the valve core assembly 22 includes a valve seat 220 which includes a first part 225 and a second part 221. The second part 221 is provided with a throttling orifice. An outer wall of the first part 225 is provided with an external screw thread corresponding to the threaded connecting portion 321. The first part 225 can be fixed to the protruding portion 32 in a sealed manner by a first sealing ring 226 and the screw threads, and a portion of the second part 221 may be connected to the positioning portion 65 in a sealed manner by a second sealing ring 223. The second part 221 is provided with a valve core inlet passage 222 and a valve core outlet passage 224, and a throttling orifice is provided between the valve core inlet passage 222 and the valve core outlet passage 224, and the valve core inlet passage 222 can be in communication with the valve core outlet passage 224 through the throttling orifice. The valve core assembly may control the degree of opening of the throttling hole by moving a valve needle toward or away from the throttling hole. Moreover, the second part 221 has an outer diameter smaller than the inner diameter of the valve core receiving cavity 33, and the second part 221 is not in contact with the inner wall of the valve core receiving cavity 33. The valve core inlet passage 222 may have multiple inlets, and it can be configured in such manner that when at least a part of the valve core inlet passage 222 is toward the groove 31, the valve core inlet passage 222 can be in communication with the groove 31 through a space between a portion of an inner wall, at a position where the valve core receiving cavity 33 is located, of the mounting plate 3 and the second part 221, thus facilitating the refrigerant's flowing into the valve core inlet passage 222 from the valve core receiving cavity 33.

A lower end of the second part 221 extends into the positioning portion 65 and is sealed by the second sealing ring 223, and the valve core outlet passage 224 can be in direct communication with the first flow passage of the heat exchanger 10. At least a part of the valve core inlet passage 222 is located in the valve core receiving cavity 33 above the positioning portion 65, and the groove 31 can be in communication with the valve core inlet passage 222 through the space between the portion of the inner wall, at the position where the valve core receiving cavity 33 is located, of the mounting plate 3 and the second part 221.

Alternatively, the positioning portion 65 may not be provided, and in this case, the second part 221 has an outer diameter greater than the inner diameter of the second port 64 and an outlet of the valve core outlet passage 224 has an inner diameter smaller than or equal to the inner diameter of the second port 64, to allow the second part 221 to be pressed against the end plate 6. In this embodiment, by providing the positioning portion 65, the sealing performance between the second part 221 and the positioning portion 65 can be improved to prevent the internal leakage.

In this way, the refrigerant, after entering from the second port 64, flows through the groove 31 to the valve core inlet passage 222, and the refrigerant, after being throttled by the valve assembly, flows directly into the heat exchanger 10 through the valve core outlet passage 224, which can greatly reduce the flow route of the refrigerant, thereby reducing the gas-liquid separation phenomenon during the flow process, improving the heat transfer performance of the heat exchanger, controlling the superheat degree better, and also improving the vibration resistance of the heat exchange device.

In assembling, the plates 8, the end plate 6, the bottom plate 7, the mounting plate, the first connection pipe 1, the second connection pipe 4 and the third connection pipe 5 are welded together by brazing. Before the welding, the plates 8, the end plate 6, the bottom plate 7, the mounting plate, the first connection pipe 1, the second connection pipe 4 and the third connection pipe 5 are assembled and are pressed tightly to be fixed by a specialized fixture. Then, the plates 8, the end plate 6, the bottom plate 7, the mounting plate, the first connection pipe 1, the second connection pipe 4 and the third connection pipe 5, which are pressed and fixed, are placed in a furnace for welding. The welding can be a vacuum brazing performed in a vacuum furnace or nitrogen protection welding performed in a tunnel furnace. After the welding is completed, the valve core assembly 22 and the coil assembly 21 are sequentially mounted on the protruding portion 32 of the mounting plate.

Figure 8:
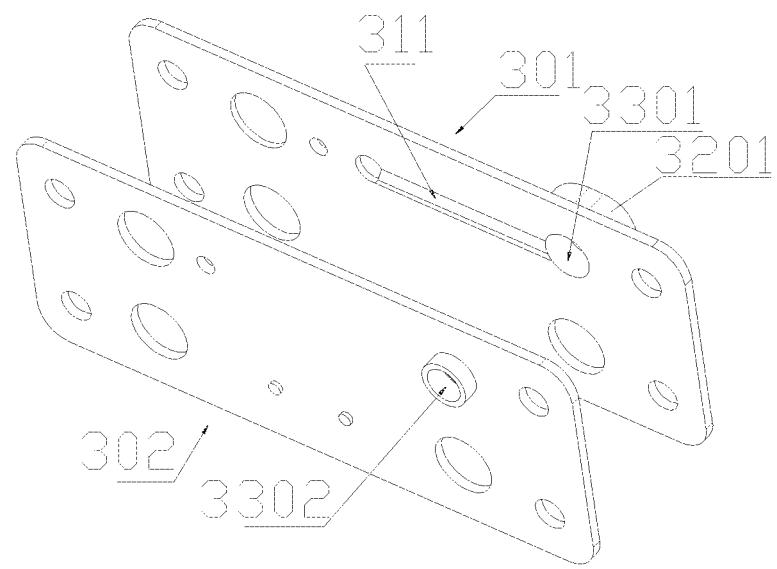
FIG. 8 is a schematic perspective view of an end plate and a mounting plate of a heat exchange device according to another embodiment of the present application.

FIG. 8 shows another embodiment of the present application. In this embodiment, the mounting plate includes a first mounting plate 301 and a second mounting plate 302. The structure of the first mounting plate 301 is same as or similar to the structure of the mounting plate 3 in the above embodiment. A front side of the first mounting plate 301 is provided with a protruding portion 3201, and the protruding portion 3201 is formed with a valve core receiving cavity 3301 extending through the first mounting plate 301, and a back side of the first mounting plate 301 is also provided with a groove 311. The second mounting plate 302 cooperates with the first mounting plate 301 and is provided with a positioning portion 3302 for cooperating with the valve core receiving cavity 331. A direction in which the positioning portion 3302 protrudes from the second mounting plate 302 is opposite to a direction in which the protruding portion 3201 protrudes from the first mounting plate 301. The structure and function of the positioning portion 3302 are same as or similar to the structure and function of the positioning portion 65 in the above-described embodiment, and in this embodiment, it is not required to provide the positioning portion 65 in the end plate 6. The first part 225 of the valve seat 220 is fixed to the protruding portion 3201 in a sealed manner, and the second part 221 of the valve seat 220 is fixed to the positioning portion 332 in a sealed manner.

The first mounting plate 301 and the second mounting plate 302 may be connected together by welding or the like. This embodiment has a simple structure, is easy to install, and is stable.

Other structures and functions of this embodiment are same as or similar to those of the above embodiments, and will not be described here again.

Figure 9:
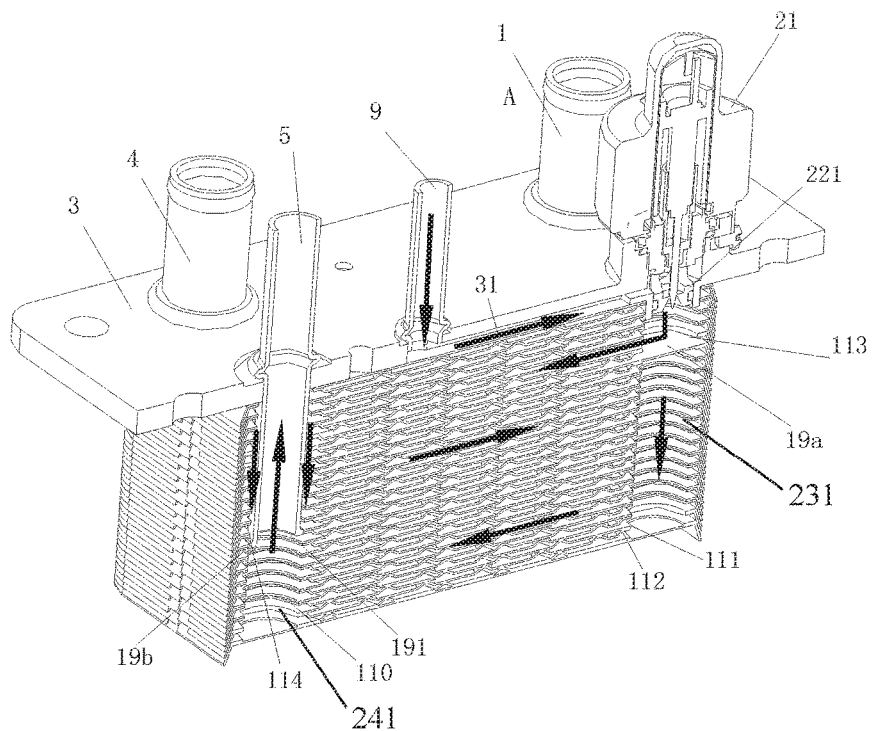
FIG. 9 is a partially schematic perspective sectional view of a heat exchange device according to still another embodiment of the present application.
Figure 10:
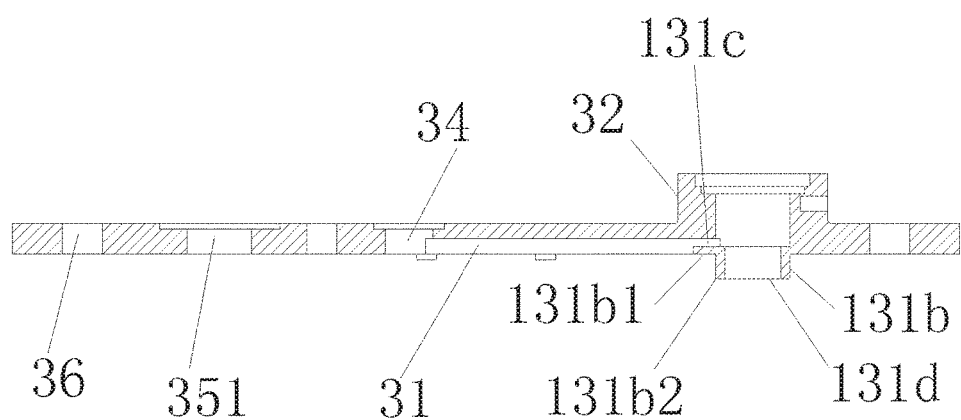
FIG. 10 is a schematic perspective view of the mounting plate of the heat exchange device shown in FIG. 9.

FIGS. 9 to 10 show still another embodiment. As compared with the first embodiment, in this embodiment, it is not necessary to provide the positioning portion 65 in the end plate 6, and a positioning portion 131b is further provided on a back side of the mounting plate 3, and a penetration hole 131d in communication with the valve core receiving cavity 33 of the protruding portion 32 is provided in the positioning portion 131b. The function and effect of the positioning portion 131b are the same as those of the positioning portion 65.

The valve core assembly 22 is assembled and fixed to the protruding portion 32, and the positioning portion 131b includes a protruding segment 131b2 and an isolation segment 131b1. The protruding segment 131b2 of the positioning portion 131b is located between the end plate 6 and the bottom plate 7. The protruding segment 131b2 has an outer diameter smaller than the inner diameter of the second port 64, and an end of the protruding segment 131b2 can pass through the second port 64. The isolation segment 131b1 of the positioning portion 131b is located outside the heat exchanger core and between the end plate 6 and the mounting plate, and is close to the groove 31. A first opening 131c is formed between the isolation segment 131b1 and the protruding portion, and the groove 31 is in communication with the valve core receiving cavity 33 through the first opening 131c. In this way, the path of the refrigerant entering the first passage can be shortened, which avoids the gas-liquid separation of the refrigerant in a long pipeline after the refrigerant passes through the valve assembly. The isolation segment 131b1 is fixed to the end plate 6 in a sealed manner, and the isolation segment 131b1 isolates the groove 31 from the first flow passage, to prevent the groove 31 from being in communication with the first flow passage, and to prevent the refrigerant from directly entering the first flow passage without passing through the valve assembly.

In this embodiment, the heat exchanger is a multi-path heat exchanger. For more clearly understanding the internal structure of the heat exchanger core, reference may be made to FIGS. 9 and 10, FIG. 9 is a partially schematic perspective sectional view of a heat exchanger 100, and FIG. 10 is a schematic sectional view of the mounting plate. The heat exchanger core 11 includes multiple stacked plates, and the plates include multiple first plates 111, multiple second plates 112 and at least one third plate 113. The first plates 111 and the second plates 112 are stacked to form first passages and second passages, and except for the two outermost plates, most of the plates each have the first passage and the second passage at two sides respectively, for example, one first plate and one of two second plates adjacent to the first plate forms a first passage, and the first plate and the other one of the two second plates adjacent to the first plate forms a second passage, and the first passage and the second passage are not in communication with each other.

Each of the first plates 111 and the second plates 112 includes a first port 23, a second port 24, a third port (not shown) and a fourth port (not shown). The first ports 23 in the plates are aligned to form a first channel 231, the second ports 24 in the plates are aligned to form a second channel 241, the third ports in the plates are aligned to form a third channel (not shown), and the fourth ports in the plates are aligned to form a fourth channel (not shown). In the heat exchanger core, the first channel and the second channel are in communication with the first passage, and the third channel and the fourth channel are in communication with the second passage.

Figure 11:
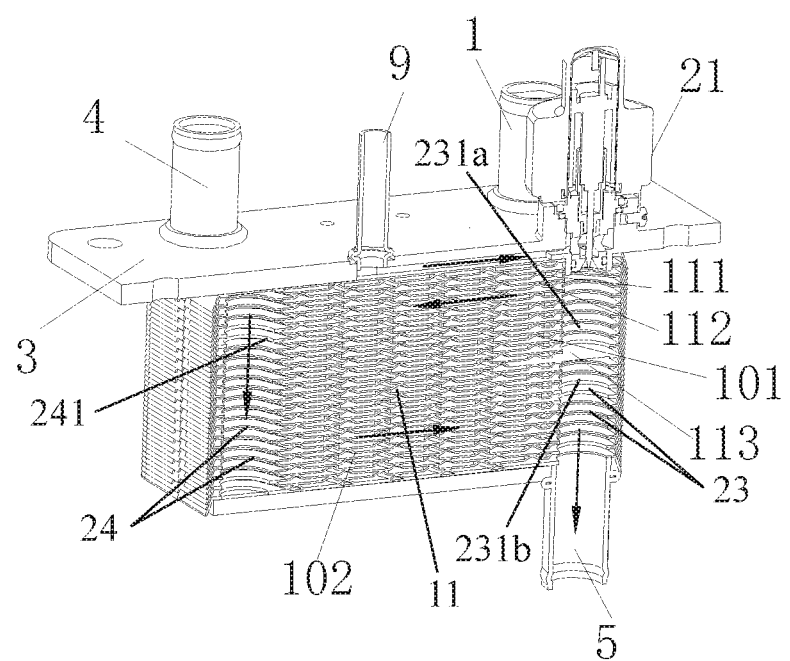
FIG. 11 is a partially schematic perspective sectional view of the heat exchange device according to still another embodiment of the present application.

Referring to FIG. 11, the third plate 113 includes a first partition part 19a and a second port 24. The second port 24 of the third plate 113, the second ports 24 of the first plates 111 and the second ports 24 of the second plates 112 are aligned to form the second channel, and the position of the first partition part 19a on the third plate 113 is corresponding to the first ports 23 of the first plates 111 and the first ports 23 of the second plates 112. The first channel 231 of the heat exchanger core 11 is partitioned by the first partition part 19a into at least two sub-channels 231a and 231b, and the first passage is divided into at least two heat exchange sections by the third plate 113, and the heat exchange sections include a first heat exchange section 101 and a second heat exchange section 102. As indicated by the arrows in the drawing, the flowing direction of fluid in the first heat exchange section 101 is opposite to the flowing direction of fluid in the second heat exchange section 102, and each of the sub-channels of the first channel is in communication with its adjacent sub-channel via the second channel.

In addition, when the refrigerant enters the heat exchanger core, the refrigerant is mostly liquid and the liquid has a density much greater than the gas. In order to prevent the volume of the refrigerant from rapidly expanding and the flow rate from rapidly increasing after the refrigerant is vaporized, the distance between the protruding segment 131b2 and the third plate is set to be small, which can reduce the flow rate of the gas and achieve a better heat transfer effect.

The heat exchanger core 11 may further include at least one fourth plate 114, the most part of the structure of the fourth plate 114 may refer to the first plate 111 and the second plate 112, and the fourth plate 114 further includes a second partition part 19b and a first port 23. The first port 23 of the fourth plate 114, the first ports 23 of the first plates 111 and the first ports 23 of the second plates 112 are aligned to form the first channel. The second channel 241 of the heat exchanger core 11 is partitioned by the second partition part 19b of the fourth plate 114 to form at least two sub-channels 241a, 241b. The third plate 113 and the fourth plate 114 are each located at a central part of the heat exchanger core, or in other words, are arranged to be spaced apart from the end plate or the bottom plate by a certain distance, and the third plate 113 and the fourth plate 114 divide the first passage into three heat exchange sections including a first heat exchange section 101, a second heat exchange section 102 and a third heat exchange section 103. The second heat exchange section 102 is located between the third plate 113 and the fourth plate 114. As indicated by the arrows in the drawing, the flowing direction of fluid in the first heat exchange section 101 is opposite to the flowing direction of fluid in the second heat exchange section 102, and the flowing direction of fluid in the second heat exchange section 102 is opposite to the flowing direction of fluid in the third heat exchange section 103. Each of the sub-channels of the first channel is in communication with its adjacent sub-channel of the first channel via the second channel, and each of the sub-channels of the second channel is in communication with its adjacent sub-channel of the second channel via the first channel. By additionally providing the third plate and the fourth plate in the heat exchanger core, the first passage is divided into at least three heat exchange sections, thus in a case that the heat exchange device has a small structure, the flowing path of the fluid is effectively lengthened, to ensure that the superheat degree of the refrigerant at the outlet of the heat exchange device can meet certain requirements, to allow the heat exchange device to have a great heat transfer performance.

The second partition part 19b of the fourth plate 114 is further provided with a mounting hole 191, and one end of the third connection pipe 5 extends into the sub-channel 110 of the second channel, which is further away from the mounting plate 13 with respect to other sub-channel of the second channel. The third connection pipe 5 and the second partition part 19b are fixed in a sealed manner, to allow a second connecting port of the third connection pipe 5 to be in communication with the mounting hole 191 of the second partition part. The third connection pipe 5 and the second partition part 19b may be fixed by welding or other manners, to isolate the fluid in the third connection pipe 5 from the sub-channel of the second channel, which is adjacent to the mounting plate with respect to other sub-channel of the second channel. This arrangement allows the third connection pipe and the fourth connection pipe to be on the same side and to be secured by the same pressing block.

Figure 12:
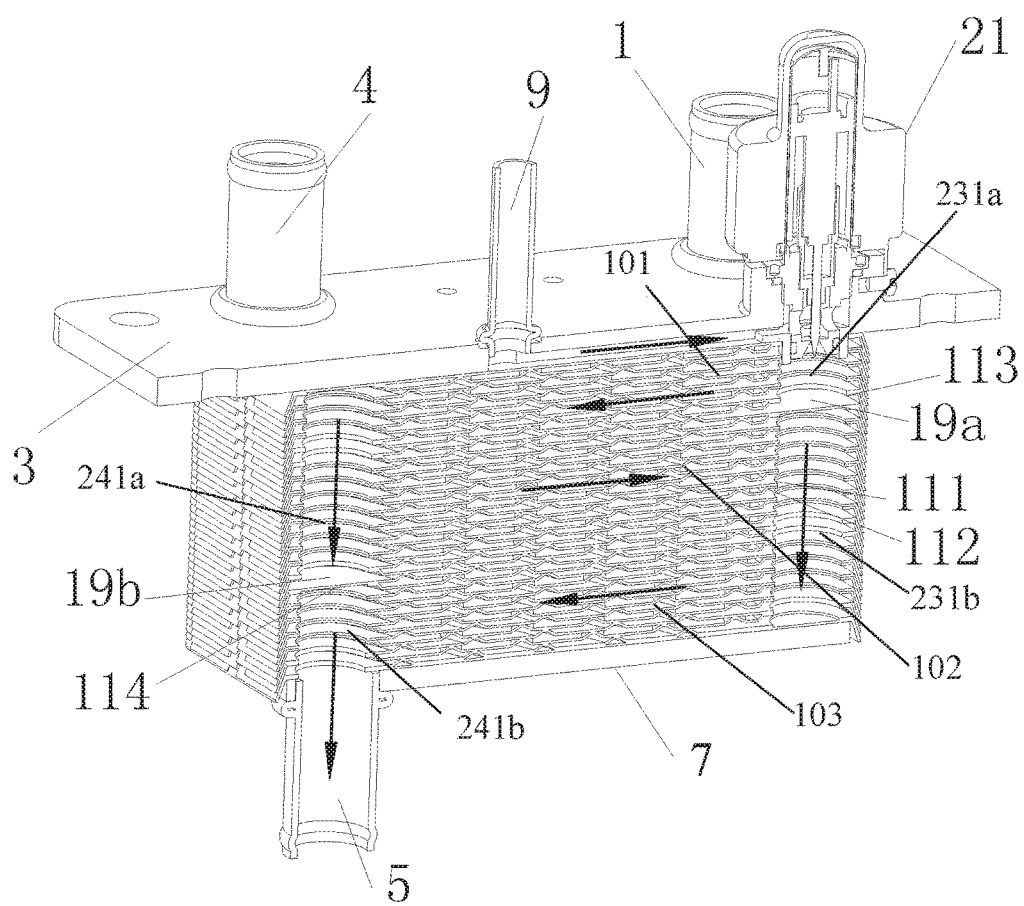
FIG. 12 is a partially schematic perspective sectional view of the heat exchange device according to still another embodiment of the present application.

Of course, the third connection pipe 5 may also be provided on the bottom plate 7 as shown in FIG. 12, and in this case, it is not necessary to extend one end of the third connection pipe 5 into the second channel.

The heat exchanger may also include the third plate 113 as shown in FIG. 11, and in this case, the heat exchanger is a two-path heat exchanger.

Other structures and features of this embodiment are same as or similar to those of the above-described embodiments, which will not be described here anymore.

The above embodiments are only intended to illustrate the present application, rather than limiting the technical solutions described in the present application. Although the present application has been described in detail in this disclosure with reference to the above embodiments, it will be understood by the person skilled in the art that, modifications or equivalent substitutions may be made to the present application by the person skilled in the art, and any technical solution and modifications thereof without departing from the spirit and scope of the present application are deemed to fall into the scope of the claims of the present application.

What is claimed is:

1. A heat exchange device, comprising:
a heat exchanger; and
a mounting plate configured to fix the heat exchange device, wherein, the heat exchanger comprises a first flow passage and a second flow passage which are not in fluid communication with each other, a front side of the mounting plate comprises a fitting portion, and the mounting plate comprises a communication hole, a protruding portion and a mounting hole which are all located at a position where the fitting portion is located, the protruding portion protrudes outwards from the front side of the mounting plate, and the mounting hole extends through the protruding portion and the mounting plate, the mounting plate defines a valve core receiving cavity at the protruding portion, and the valve core receiving cavity is a part of the mounting hole; a back side of the mounting plate is further provided with a groove, and the valve core receiving cavity is in communication with the communication hole via the groove;
the heat exchange device is further provided with a positioning portion, and the positioning portion extends into the first flow passage, and
the mounting plate is fixed to the heat exchanger in a sealed manner, the mounting hole is in communication with the first flow passage, and the communication hole is in communication with the first flow passage via the groove and the mounting hole.

2. The heat exchange device according to claim 1, wherein the heat exchanger comprises a heat exchanger core, and an end plate and a bottom plate respectively located at two ends of the heat exchanger core, the end plate is provided with a port, and the positioning portion is provided at an outer peripheral side of the port and protrudes from a plate plane of the end plate by a certain height, the positioning portion is a hollow structure, and the hollow structure of the positioning portion has an inner diameter smaller than or equal to an inner diameter of the port, and the port is toward the mounting hole and is in communication with the mounting hole.

3. The heat exchange device according to claim 2, wherein a direction in which the positioning portion protrudes from the plate plane of the end plate is opposite to a direction in which the protruding portion protrudes from the front side of the mounting plate, the valve core receiving cavity comprises a first cavity, a second cavity and a third cavity sequentially from bottom to top, and inner diameters of the first cavity, the second cavity and the third cavity are sequentially increased; an inner wall of the first cavity is provided with a threaded connecting portion, and the first cavity has an inner diameter greater than or equal to the inner diameter of the port, and a projection of the port on the mounting plate partially coincides with or completely coincides with a projection of the valve core receiving cavity on the mounting plate.

4. The heat exchange device according to claim 3, wherein the heat exchange device further comprises a valve assembly, the valve assembly comprises a valve seat, and the valve seat comprises a first part and a second part which are respectively upper and lower portions, and a portion of the first part is fixed to the valve core receiving cavity in a sealed manner, and the second part is fixed to the positioning portion in a sealed manner, the second part comprises a valve core inlet passage, a valve core outlet passage, and a throttling orifice, and the throttling orifice is provided between the valve core inlet passage and the valve core outlet passage, a dimension of a flow passage of the throttling orifice is adjustable, and the valve core inlet passage is in communication with the valve core outlet passage through the throttling orifice; and the valve core inlet passage is in communication with the groove, and the valve core outlet passage is in communication with the first flow passage.

5. The heat exchange device according to claim 4, wherein an outer diameter of the second part is smaller than an outer diameter of the first part and smaller than an inner diameter of the valve core receiving cavity, the second part is not in contact with an inner wall of the valve core receiving cavity, and the communication hole is in communication with the valve core inlet passage through the groove and a space between the second part and a portion of an inner wall, at a position where the valve core receiving cavity is located, of the mounting plate.

6. The heat exchange device according to claim 5, wherein a lower end of the second part extends into the positioning portion, and the lower end of the second part and a portion, corresponding to the positioning portion, of an inner wall of the mounting hole are mounted in a sealed manner by a sealing ring, and the valve core outlet passage is in direct communication with the first flow passage of the heat exchanger, and at least a part of the valve core inlet passage is located in the valve core receiving cavity above the positioning portion.

7. The heat exchange device according to claim 3, wherein the heat exchanger comprises a plurality of plates which are stacked, the plates comprise a plurality of first plates, a plurality of second plates, and a third plate, the plates are stacked to form the first flow passage and the second flow passage, each of the first plates comprises a first port and a second port, each of the second plates also comprises a first port and a second port, the third plate comprises a first partition part and a second port, the first partition part is located on the third plate at a position corresponding to the first ports of the first plates and the second plates, the first plates and the second plates are stacked to allow the first ports of the first plates and the first ports of the second plates to be aligned to form a first channel; and the first plates, the second plates and the third plate are stacked to allow the second ports of the first plates, the second ports of the second plates and the second port of the third plate to be aligned to form a second channel; the first channel and the second channel are a part of the first flow passage, the first channel is partitioned into at least two sub-channels by the first partition part, and each of the sub-channels of the first channel is in communication with an adjacent sub-channel of the first channel via the second channel; the first flow passage is divided into at least two heat exchange sections by the third plate, and flow directions of fluid in adjacent heat exchange sections are opposite to each other.

8. The heat exchange device according to claim 1, wherein the heat exchanger comprises a heat exchanger core, and an end plate and a bottom plate respectively located at two ends of the heat exchanger core, the end plate is provided with a port, and the mounting plate comprises a first mounting plate and a second mounting plate, the second mounting plate is closer to the heat exchanger than the first mounting plate, the protruding portion is formed on a front side of the first mounting plate, the groove is formed in a back side of the first mounting plate, and the communication hole extends through the first mounting plate, the positioning portion is arranged on the second mounting plate and is configured to cooperate with the valve core receiving cavity; a direction in which the positioning portion protrudes from the second mounting plate is opposite to a direction in which the protruding portion protrudes from the first mounting plate, the mounting hole extends though the protruding portion, the first mounting plate, the second mounting plate and the positioning portion, and the first mounting plate cooperates with the second mounting plate and is mounted to the second mounting plate in a sealed manner.

9. The heat exchange device according to claim 8, wherein the heat exchange device further comprises a valve assembly, the valve assembly comprises a valve seat, and the valve seat comprises a first part and a second part which are respectively upper and lower portions, and a portion of the first part is fixed to the valve core receiving cavity in a sealed manner, and the second part is fixed to the positioning portion in a sealed manner, the second part comprises a valve core inlet passage, a valve core outlet passage, and a throttling orifice, and the throttling orifice is provided between the valve core inlet passage and the valve core outlet passage, a dimension of a flow passage of the throttling orifice is adjustable, and the valve core inlet passage is in communication with the valve core outlet passage through the throttling orifice; and the valve core inlet passage is in communication with the groove, and the valve core outlet passage is in communication with the first flow passage.

10. The heat exchange device according to claim 8, wherein the heat exchanger comprises a plurality of plates which are stacked, the plates comprise a plurality of first plates, a plurality of second plates, and a third plate, the plates are stacked to form the first flow passage and the second flow passage, each of the first plates comprises a first port and a second port, each of the second plates also comprises a first port and a second port, the third plate comprises a first partition part and a second port, the first partition part is located on the third plate at a position corresponding to the first ports of the first plates and the second plates, the first plates and the second plates are stacked to allow the first ports of the first plates and the first ports of the second plates to be aligned to form a first channel; and the first plates, the second plates and the third plate are stacked to allow the second ports of the first plates, the second ports of the second plates and the second port of the third plate to be aligned to form a second channel; the first channel and the second channel are a part of the first flow passage, the first channel is partitioned into at least two sub-channels by the first partition part, and each of the sub-channels of the first channel is in communication with an adjacent sub-channel of the first channel via the second channel; the first flow passage is divided into at least two heat exchange sections by the third plate, and flow directions of fluid in adjacent heat exchange sections are opposite to each other.

11. The heat exchange device according to claim 1, wherein the heat exchanger comprises a heat exchanger core, and an end plate and a bottom plate respectively located at two ends of the heat exchanger core, the end plate is provided with a port, the positioning portion is arranged on a back side of the mounting plate, the positioning portion is opposite to the protruding portion, and the mounting hole extends through the protruding portion and the positioning portion, the positioning portion comprises a protruding segment and an isolation segment, the protruding segment of the positioning portion is located between the end plate and the bottom plate, the protruding segment has an outer diameter smaller than an inner diameter of the port, and an end of the protruding segment passes through the port; the isolation segment of the positioning portion is located outside the heat exchanger core, the isolation segment is located between the end plate and the mounting plate, and the isolation segment is close to the groove, and a first opening is formed between the isolation segment and the protruding portion, and the groove is in communication with the mounting hole through the first opening.

12. The heat exchange device according to claim 11, wherein the heat exchange device further comprises a valve assembly, the valve assembly comprises a valve seat, and the valve seat comprises a first part and a second part which are respectively upper and lower portions, and a portion of the first part is fixed to the valve core receiving cavity in a sealed manner, and the second part is fixed to the positioning portion in a sealed manner, the second part comprises a valve core inlet passage, a valve core outlet passage, and a throttling orifice, and the throttling orifice is provided between the valve core inlet passage and the valve core outlet passage, a dimension of a flow passage of the throttling orifice is adjustable, and the valve core inlet passage is in communication with the valve core outlet passage through the throttling orifice; and the valve core inlet passage is in communication with the groove, and the valve core outlet passage is in communication with the first flow passage.

13. The heat exchange device according to claim 11, wherein the heat exchanger comprises a plurality of plates which are stacked, the plates comprise a plurality of first plates, a plurality of second plates, and a third plate, the plates are stacked to form the first flow passage and the second flow passage, each of the first plates comprises a first port and a second port, each of the second plates also comprises a first port and a second port, the third plate comprises a first partition part and a second port, the first partition part is located on the third plate at a position corresponding to the first ports of the first plates and the second plates, the first plates and the second plates are stacked to allow the first ports of the first plates and the first ports of the second plates to be aligned to form a first channel; and the first plates, the second plates and the third plate are stacked to allow the second ports of the first plates, the second ports of the second plates and the second port of the third plate to be aligned to form a second channel; the first channel and the second channel are a part of the first flow passage, the first channel is partitioned into at least two sub-channels by the first partition part, and each of the sub-channels of the first channel is in communication with an adjacent sub-channel of the first channel via the second channel; the first flow passage is divided into at least two heat exchange sections by the third plate, and flow directions of fluid in adjacent heat exchange sections are opposite to each other.

14. The heat exchange device according to claim 1, wherein the heat exchanger comprises a plurality of plates which are stacked, the plates comprise a plurality of first plates, a plurality of second plates, and a third plate, the plates are stacked to form the first flow passage and the second flow passage, each of the first plates comprises a first port and a second port, each of the second plates also comprises a first port and a second port, the third plate comprises a first partition part and a second port, the first partition part is located on the third plate at a position corresponding to the first ports of the first plates and the second plates, the first plates and the second plates are stacked to allow the first ports of the first plates and the first ports of the second plates to be aligned to form a first channel; and the first plates, the second plates and the third plate are stacked to allow the second ports of the first plates, the second ports of the second plates and the second port of the third plate to be aligned to form a second channel; the first channel and the second channel are a part of the first flow passage, the first channel is partitioned into at least two sub-channels by the first partition part, and each of the sub-channels of the first channel is in communication with an adjacent sub-channel of the first channel via the second channel; the first flow passage is divided into at least two heat exchange sections by the third plate, and flow directions of fluid in adjacent heat exchange sections are opposite to each other.

15. The heat exchange device according to claim 14, wherein the plates further comprise at least one fourth plate, the fourth plate is further away from the mounting plate than the third plate, the fourth plate comprises a first port and a second partition part, the second partition part is located on the fourth plate at a position corresponding to the second ports of the first plates, the second ports of the second plates and the second port of the third plate; the first plates, the second plates and the fourth plate are stacked to allow the first ports of the first plates, the first ports of the second plates, and the first port of the fourth plate to be aligned to form a first channel; the first plates, the second plates and the third plate are stacked to allow the second ports of the first plates, the second ports of the second plates, and the second port of the third plate to be aligned to form a second channel; the first channel is partitioned into at least two sub-channels by the first partition part, and the second channel is divided into at least two sub-channels by the second partition part, and each of the sub-channels of the first channel is in communication with an adjacent sub-channel of the first channel through the second channel, and each of the sub-channels of the second channel is in communication with an adjacent sub-channel of the second channel through the first channel, the first flow passage is divided into a plurality of heat exchange sections by the third plate and the fourth plate, and flow directions of fluid in adjacent heat exchange sections are opposite to each other.

16. The heat exchange device according to claim 15, wherein the heat exchange device is provided with a first through hole, a second through hole, a third through hole and a fourth through hole; the first through hole and the second through hole are in communication with the second flow passage, and the third through hole and the fourth through hole are in communication with the first flow passage, the fourth through hole is located in the mounting plate, and the communication hole in communication with the groove is the fourth through hole, and the third through hole is located in the bottom plate, and the plurality of heat exchange sections comprises a first heat exchange section, a second heat exchange section and a third heat exchange section which are divided by the third plate and the fourth plate, and the third through hole is in communication with the sub-channel, away from the mounting plate, of the second channel; and the fourth through hole is in communication with the third through hole via the groove, the sub-channel of the first channel which is close to the mounting plate, the sub-channel of the second channel which is close to the mounting plate, the sub-channel of the first channel which is away from the mounting plate, and the sub-channel of the second channel which is away from the mounting plate.

17. The heat exchange device according to claim 15, wherein the heat exchange device is provided with a first through hole, a second through hole, a third through hole and a fourth through hole; the first through hole and the second through hole are in communication with the second flow passage, and the third through hole and the fourth through hole are in communication with the first flow passage, the third through hole and the fourth through hole are located in the mounting plate, and the fourth through hole is the communication hole in communication with the groove, and the heat exchanger further comprises a first connection pipe in communication with the first through hole, a second connection pipe in communication with the second through hole, a third connection pipe in communication with the third through hole, and a fourth connection pipe in communication with the fourth through hole; the third connection pipe has an outer diameter smaller than an inner diameter of the second channel, and one end of the third connection pipe extends into the sub-channel, away from the mounting plate, of the second channel;

the second partition part of the fourth plate has an opening, the third connection pipe passes through the opening of the second partition part, and the third connection pipe is fixed to the opening of the second partition part in a sealed manner.

18. The heat exchange device according to claim 14, wherein the heat exchange device is provided with a first through hole, a second through hole, a third through hole and a fourth through hole, the first through hole and the second through hole are in communication with the second flow passage, and the third through hole and the fourth through hole are in communication with the first flow passage, and the fourth through hole is located in the mounting plate, the fourth through hole is the communication hole in communication with the groove, and the third through hole is located in the bottom plate, and the at least two heat exchange sections comprise a first heat exchange section and a second heat exchange section divided by the third plate, the third through hole is in communication with the sub-channel, away from the mounting plate, of the first channel, and the fourth through hole is in communication with the third through hole via the groove, the sub-channel of the first channel which is close to the mounting plate, the second channel, and the sub-channel of the first channel which is away from the mounting plate.

19. The heat exchange device according to claim 1, wherein the back side of the mounting plate is further provided with at least two positioning protrusions which protrude from the back side of the mounting plate by a certain height, the end plate is provided with positioning holes corresponding to the positioning protrusions respectively, and the positioning protrusions are fitted with the positioning holes respectively; the valve assembly further comprises a coil assembly, and an outer side wall of the protruding portion is provided with a threaded fixing portion configured to fix the coil assembly.

20. The heat exchange device according to claim 1, wherein the heat exchanger is an evaporator, the first flow passage is configured to allow circulation of a refrigerant, and the second flow passage is configured to allow circulation of a coolant; and the heat exchange device is provided with a first through hole, a second through hole, a third through hole and a fourth through hole; the first through hole and the second through hole are in communication with the second flow passage, and the third through hole and the fourth through hole are in communication with the first flow passage, and the fourth through hole is the communication hole in communication with the groove; the heat exchanger further comprises a first connection pipe in communication with the first through hole, a second connection pipe in communication with the second through hole, a third connection pipe in communication with the third through hole, and a fourth connection pipe in communication with the fourth through hole; the first connection pipe is a coolant outlet pipe, and the second connection pipe is a coolant inlet pipe; the fourth connection pipe is a refrigerant inlet pipe and the third connection pipe is a refrigerant outlet pipe, and the fourth through hole has an inner diameter smaller than an inner diameter of the third through hole.

* * * * *